(12) United States Patent
Milstead

(10) Patent No.: US 9,319,641 B2
(45) Date of Patent: Apr. 19, 2016

(54) CONTROLLING MOVEMENT OF A CAMERA TO AUTONOMOUSLY TRACK A MOBILE OBJECT

(71) Applicant: The Boeing Company, Seal Beach, CA (US)

(72) Inventor: James M. Milstead, Madison, AL (US)

(73) Assignee: The Boeing Company, Chicago, IL (US)

( * ) Notice: Subject to any disclaimer, the term of this patent is extended or adjusted under 35 U.S.C. 154(b) by 309 days.

(21) Appl. No.: 13/949,428

(22) Filed: Jul. 24, 2013

(65) Prior Publication Data

US 2015/0029332 A1 Jan. 29, 2015

(51) Int. Cl.
*H04N 7/18* (2006.01)
*H04N 5/225* (2006.01)
*H04N 7/12* (2006.01)
*G08B 13/196* (2006.01)

(52) U.S. Cl.
CPC .......... *H04N 7/183* (2013.01); *G08B 13/19608* (2013.01)

(58) Field of Classification Search
CPC .......................... H04N 7/183; G08B 13/19608
USPC ............. 348/143, 155, 157, 169; 375/240.08, 375/240.16
See application file for complete search history.

(56) References Cited

U.S. PATENT DOCUMENTS

| | | | |
|---|---|---|---|
| 7,227,893 B1* | 6/2007 | Srinivasa | G06K 9/00771 348/155 |
| 2010/0026809 A1* | 2/2010 | Curry | H04N 5/222 348/157 |
| 2010/0085437 A1 | 4/2010 | Troy et al. | |
| 2012/0304085 A1 | 11/2012 | Kim et al. | |

OTHER PUBLICATIONS

Fan et al., "Closed-Loop Adaptation for Robust Tracking," Copyright 2010, ECCV 2010, Part I, LNCS 6311, pp. 411-424, 14 pages.
"Secure Border Initiative—DHS Needs to Address Testing and Performance Limitations That Place Key Technology Program at Risk," GAO-10-158 Secure Border Initiative Network, Jan. 2010, 47 pages.
Yilmaz et al., "Object Tracking: A Survey," copyright 2006, ACM Computing Surveys, vol. 38, No. 4, Article 13, 45 pages.

\* cited by examiner

*Primary Examiner* — Thai Tran
*Assistant Examiner* — Syed Hasan
(74) *Attorney, Agent, or Firm* — Womble Carlyle Sandridge & Rice LLP

(57) ABSTRACT

A method is provided that includes receiving from a camera, video depicting a scene having a center bounded by first and second horizontal edges. The scene also includes an identified object of interest (OI) having a region around the identified OI and a motion vector representing a location, and an amount and at least a horizontal direction of movement. The method also includes calculating from the location of the identified OI, a distance of the identified OI from either or both of the horizontal edges of the scene, and in which the first horizontal edge is in the horizontal direction of movement and the second horizontal edge is opposite the horizontal direction of movement. And the method includes causing an increase or decrease in speed of the camera in the horizontal direction of movement based on location of the identified OI relative to the first/second horizontal edges.

20 Claims, 6 Drawing Sheets

CONTROLLING MOVEMENT OF A CAMERA TO AUTONOMOUSLY TRACK A MOBILE OBJECT

TECHNOLOGICAL FIELD

The present disclosure relates generally to monitoring and surveillance and, in particular, to autonomously tracking mobile objects.

BACKGROUND

There is a growing desire to be able to monitor, in real time, predefined geographic areas for security purposes. Such areas may include battlefield areas where military operations are underway or anticipated, border areas separating two countries, or stretches of highways or roads. Areas where large numbers of individuals might be expected often are also in need of security monitoring. Such areas may involve, without limitation, stadiums, public parks, tourist attractions, theme parks or areas where large groups of individuals might be expected to congregate, such as at a public rally. In many applications involving security monitoring, it is important to be able to quickly detect objects-of-interest (OIs) such as unauthorized persons, vehicles or even suspicious appearing objects within the area being monitored. However, present day monitoring and surveillance systems suffer from numerous limitations that can negatively impact their effectiveness in providing real-time monitoring of large geographic areas or areas densely populated with potential OIs.

Present day monitoring and surveillance systems often employ cameras to image a predetermined geographic area. A camera may provide a limited but movable field of view to enable surveillance of a larger area. But to track moving objects within the geographic area often requires a human operator to control the camera's field of view to track a mobile OI. The operator must therefore multitask between continuously moving the cameras to track the OI, and relaying information to officers in the field who may be trying to locate or even confront the OI.

Therefore, it may be desirable to have a system and method that takes into account at least some of the issues discussed above, as well as possibly other issues.

BRIEF SUMMARY

Example implementations of the present disclosure are generally directed to an improved apparatus, method and computer-readable storage medium for controlling movement of a camera to autonomously track a mobile object. The system and method of example implementations may automatically control movement of a camera's field-of-view to track a mobile OI. The system and method may reduce an operator's workload so that they may more effectively focus on helping the field officers and spend less of their time/attention on camera control.

According to one aspect of example implementations, the method includes receiving from a camera, video depicting a scene having a center bounded by a first horizontal edge and a second horizontal edge. The scene also includes an identified object of interest (OI) having characteristic information including a region around the identified OI and a motion vector representing a location, and an amount and at least a horizontal direction of movement of the identified OI within the scene.

The method also includes calculating from the location of the identified OI, a distance of the identified OI from either or both of the horizontal edges of the scene, and in which the first horizontal edge is in the horizontal direction of movement and the second horizontal edge is opposite the horizontal direction of movement. And the method includes at least one of causing an increase or decrease in speed of the camera in the horizontal direction of movement based on location of the identified OI relative to the first/second horizontal edges. That is, an increase in speed of the camera may be caused in an instance in which the identified OI is located less than a first certain distance from the first horizontal edge. Or a decrease in speed of the camera may be caused in an instance in which the identified OI is located less than a second certain distance from the second horizontal edge.

In one example, the increase in speed of the camera may be up to lower of a set maximum speed and a certain number of increments in a range of speeds between a set minimum speed and the set maximum speed. In this example, at least the set maximum speed is less than a maximum capable speed of the camera.

In one example, the method may further include calculating a speed of the OI in the horizontal direction of movement. In this example, the method may include maintaining the speed of the camera if the speed of the OI is greater than a certain speed; or otherwise, causing a decrease in the speed of the camera to zero.

In one example, the method may further include calculating a speed of the OI in the horizontal direction of movement. In this example, the method may include calculating a difference in speed between the identified OI and camera. The difference in speed may indicate the identified OI moving away from or toward the center of the scene.

In at least one instance in which the identified OI is moving away from the center of the scene and the difference in speed is greater than a certain speed, the method may include causing an increase or decrease in speed of the camera based on location of the identified OI relative to the center of the scene. That is, an increase in speed of the camera may be caused if the identified OI is between the center of the scene and the first horizontal edge; or otherwise, a decrease in speed of the camera may be caused if the identified OI is between the center of the scene and the second horizontal edge.

In at least one instance in which the identified OI is moving toward the center of the scene and the difference in speed is greater than a certain speed, the method may include maintaining the speed of the camera, or otherwise causing a decrease in the speed of the camera if the identified OI is within a certain distance of the center of the scene.

In one example, the direction of movement may also include a vertical direction of movement. In this example, the method may further include causing movement of the camera in the vertical direction of movement and at a set minimum speed for a certain time in an instance in which the identified OI is more than a certain distance from the center of the scene in the vertical direction of movement.

In one example, the scene may include a plurality of identified objects. In this example, the method may include selecting one of the identified objects as the OI. In this regard, the selected one of the identified objects may be located closest to the center of the scene, or located closest to a user-selected location within the scene.

In one example, receiving video may include continuously receiving frames of video, and including one or more updates to the OI each of which includes a change in either or both of the region around the identified OI or the motion vector. In this example, calculating the distance, and causing the increase in the speed and/or the decrease in the speed may occur during tracking of the OI, and continue as long as updates to the OI are received with at least a certain threshold period or frequency.

In a further example, in an instance in which an update to the OI is not received within the certain threshold, the method may further include determining if the scene includes an identified object located within a certain distance of a last updated location of the OI in the horizontal direction of movement. The method may include selecting the respective identified object as the OI if the scene includes the respective identified object; or otherwise if the scene does not include the respective identified object, waiting up to an additional certain threshold time to receive an update to the OI, in which case tracking of the OI continues.

In other aspects of example implementations, an apparatus and a computer-readable storage medium are provided for controlling movement of a camera to autonomously track a mobile object.

According to another aspect of example implementations, the computer-readable storage medium has computer-readable program code stored therein that, in response to execution by a processor, cause an apparatus to at least a number of operations. The apparatus is caused to receive from a camera, video depicting a scene having a center bounded by a first horizontal edge and a second horizontal edge. The scene also includes an identified object of interest (OI) having characteristic information including a region around the identified OI and a motion vector representing a location, and an amount and at least a horizontal direction of movement of the identified OI within the scene.

The apparatus is also caused to calculate from the location of the identified OI, a distance of the identified OI from either or both of the horizontal edges of the scene, and in which the first horizontal edge is in the horizontal direction of movement and the second horizontal edge is opposite the horizontal direction of movement. And the apparatus is caused to at least one of cause an increase or decrease in speed of the camera in the horizontal direction of movement based on location of the identified OI relative to the first/second horizontal edges. That is, an increase in speed of the camera may be caused in an instance in which the identified OI is located less than a first certain distance from the first horizontal edge. Or a decrease in speed of the camera may be caused in an instance in which the identified OI is located less than a second certain distance from the second horizontal edge.

In one example, the apparatus being caused to cause the increase in the speed of the camera may include being caused to cause the increase in the speed of the camera up to lower of a set maximum speed and a certain number of increments in a range of speeds between a set minimum speed and the set maximum speed. In this example, at least the set maximum speed may be less than a maximum capable speed of the camera.

In various examples, the computer-readable storage medium may have further computer-readable program code stored therein that, in response to execution by the processor, causes the apparatus to perform further operations.

In one example, the apparatus may be further caused to calculate a speed of the OI in the horizontal direction of movement. And the apparatus may be caused to maintain the speed of the camera if the speed of the OI is greater than a certain speed; or otherwise, cause a decrease in the speed of the camera to zero.

In some examples, the apparatus may be further caused to calculate a speed of the OI in the horizontal direction of movement, and calculate a difference in speed between the identified OI and camera, where the difference in speed may indicate the identified OI moving away from or toward the center of the scene. In at least one instance in which the identified OI is moving away from the center of the scene and the difference in speed is greater than a certain speed, the apparatus may be caused to cause an increase in the speed of the camera if the identified OI is between the center of the scene and the first horizontal edge; or otherwise, cause a decrease in the speed of the camera if the identified OI is between the center of the scene and the second horizontal edge. And at least one instance in which the identified OI is moving toward the center of the scene and the difference in speed is greater than a certain speed, the apparatus may be caused to maintain the speed of the camera, or otherwise cause a decrease in the speed of the camera if the identified OI is within a certain distance of the center of the scene.

In one example, the direction of movement may also include a vertical direction of movement. In this example, the apparatus may be further caused to cause movement of the camera in the vertical direction of movement and at a set minimum speed for a certain time in an instance in which the identified OI is more than a certain distance from the center of the scene in the vertical direction of movement.

In one example, the scene may include a plurality of identified objects. In this example, the apparatus may be further caused to select one of the identified objects as the OI, where the selected one of the identified objects may be located closest to the center of the scene, or located closest to a user-selected location within the scene.

In one example, the apparatus being caused to receive video may include being caused to continuously receive frames of video, and include one or more updates to the OI each of which includes a change in either or both of the region around the identified OI or the motion vector. In this example, the apparatus may be caused to calculate the distance, and at least one of cause the increase in the speed or the decrease in the speed occur during tracking of the OI, and continue as long as updates to the OI are received with at least a certain threshold period or frequency.

In a further example, the apparatus may be further caused to determine if the scene includes an identified object located within a certain distance of a last updated location of the OI in the horizontal direction of movement. In this further example, the apparatus may also be further caused to select the respective identified object as the OI if the scene includes the respective identified object; or otherwise if the scene does not include the respective identified object, wait up to an additional certain threshold time to receive an update to the OI, in which case tracking of the OI continues.

The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

Figure 3:
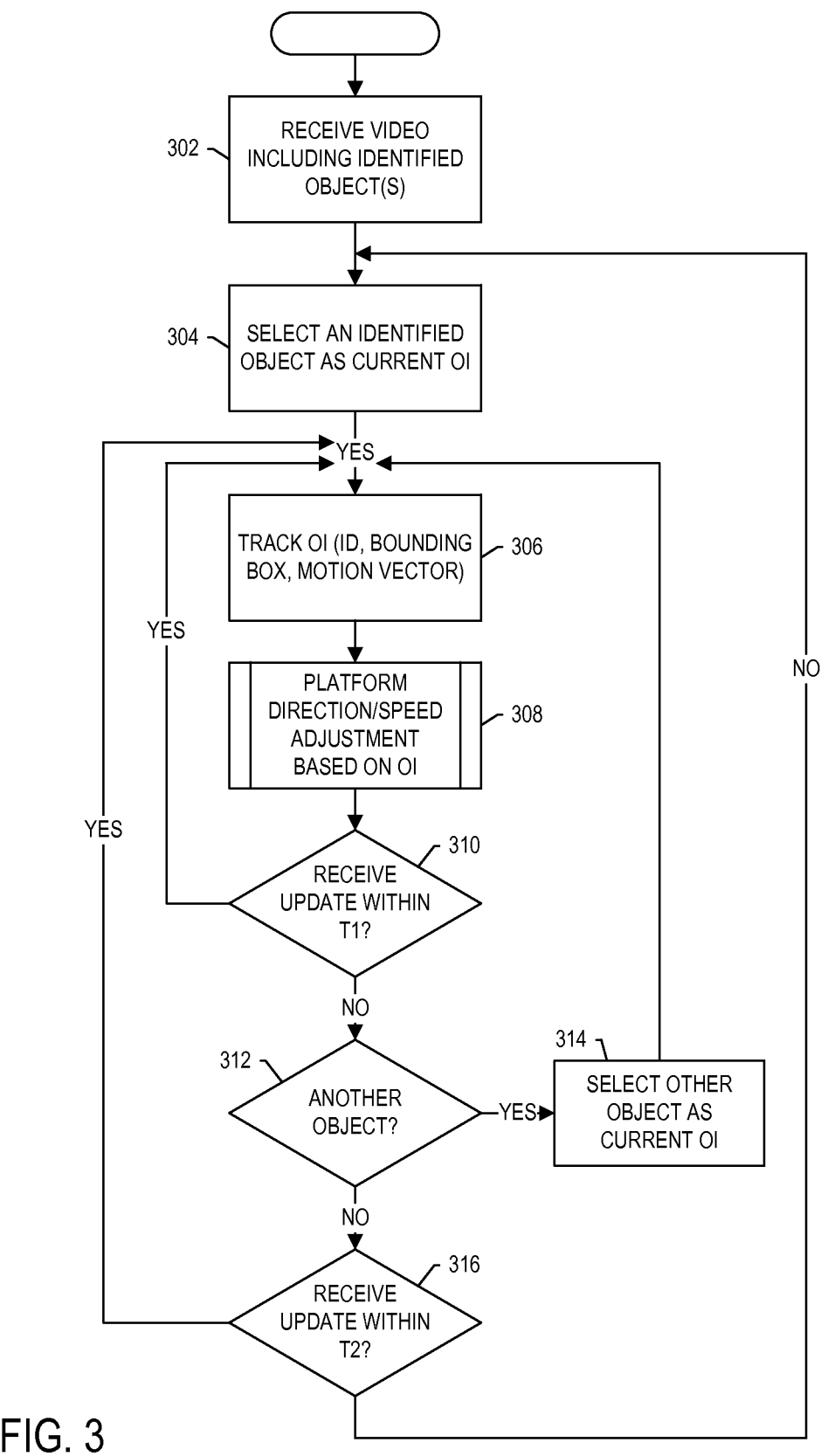
Figure 4A:
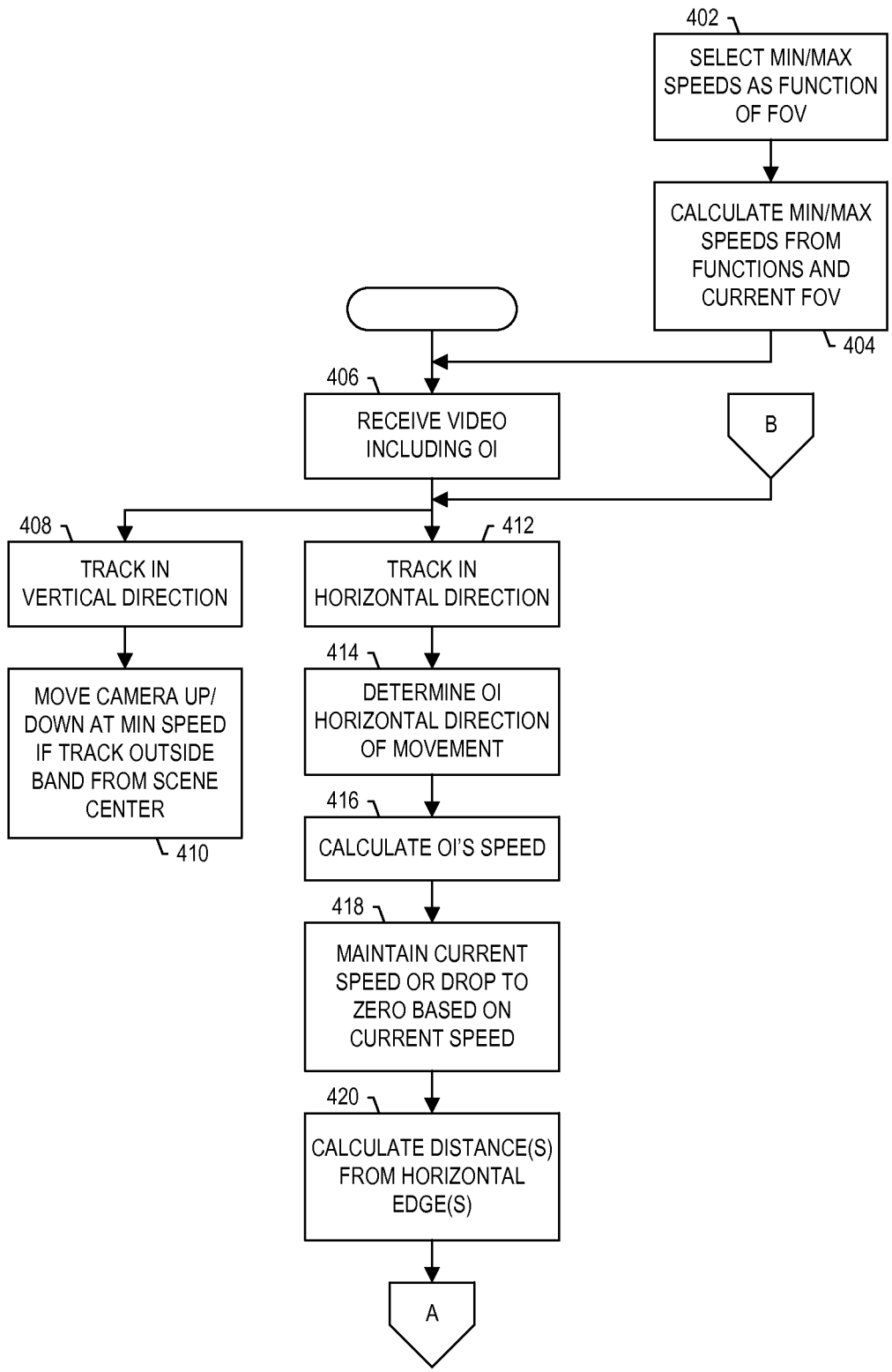
Figure 4B:
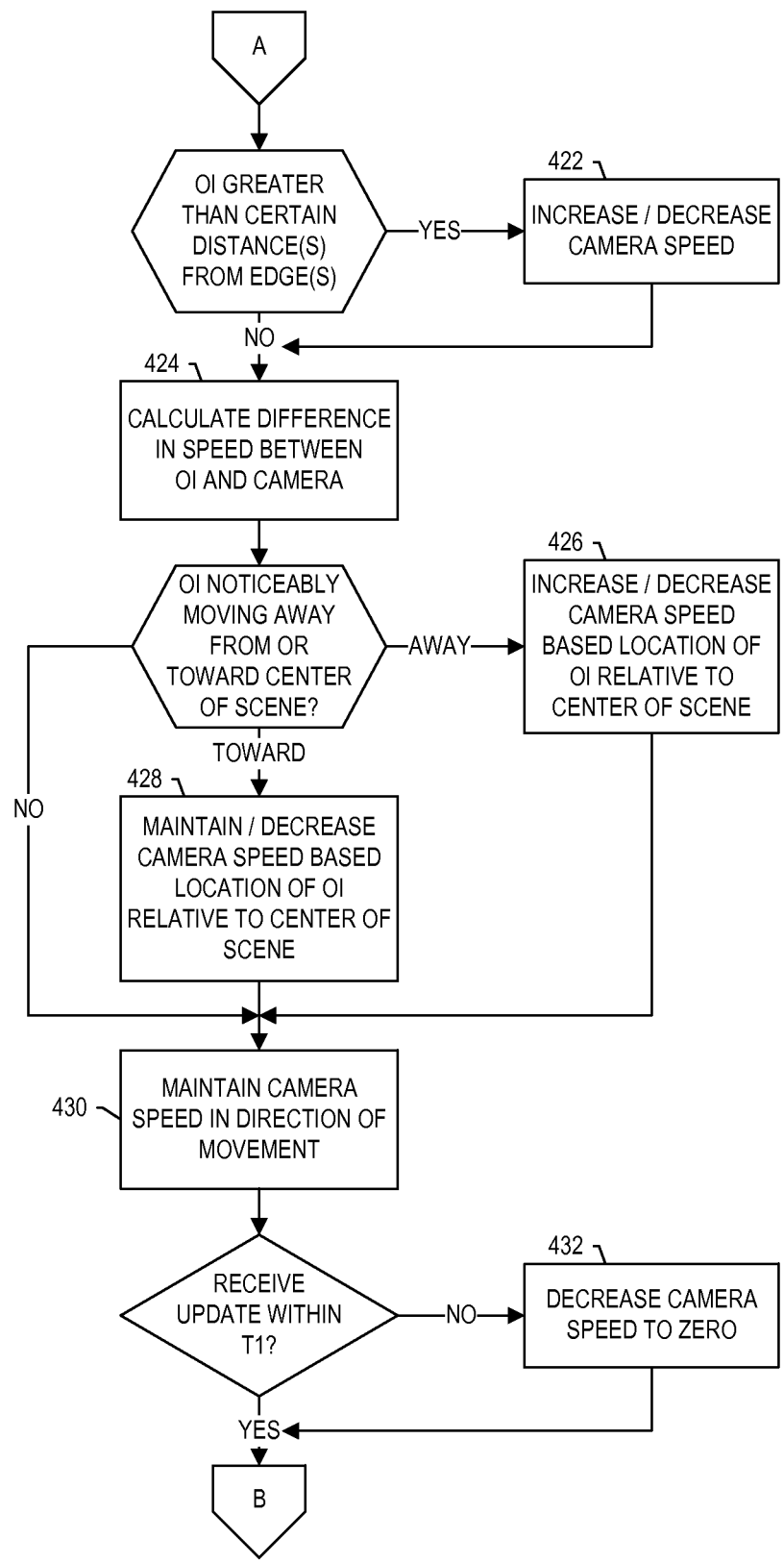
Figure 5:
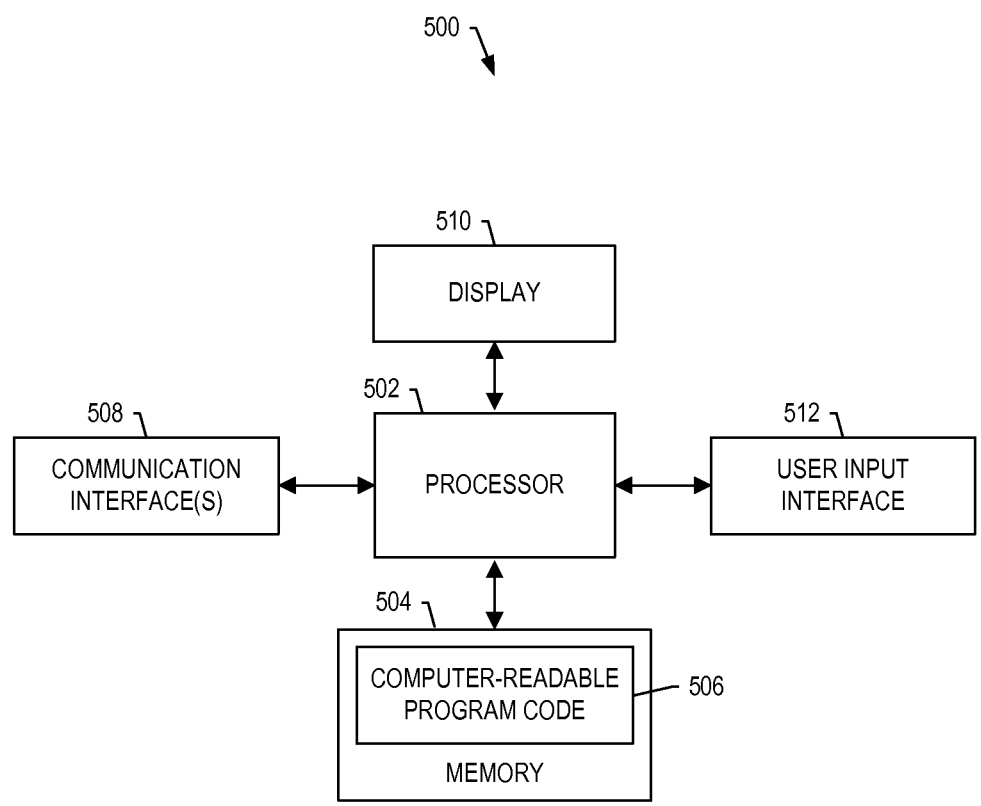

FIGS. 3 and 4 (including 4a and 4b) are flowcharts illustrating various operations of methods according to various example implementations; and FIG. 5 illustrates an apparatus that according to some examples may be configured to at least partially implement an analysis and control system.

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Also, something may be shown or described as being to the left of something else may apply equally to it being to the right, and vice versa (and similarly for being above or below). Further, although reference may be made herein to a number of measures, thresholds and the like such as times, distances, speeds, percentages and the like, according to which aspects of example implementations may operate; unless stated otherwise, any or all of the measures/thresholds may be configurable. Like reference numerals refer to like elements throughout.

Figure 1:
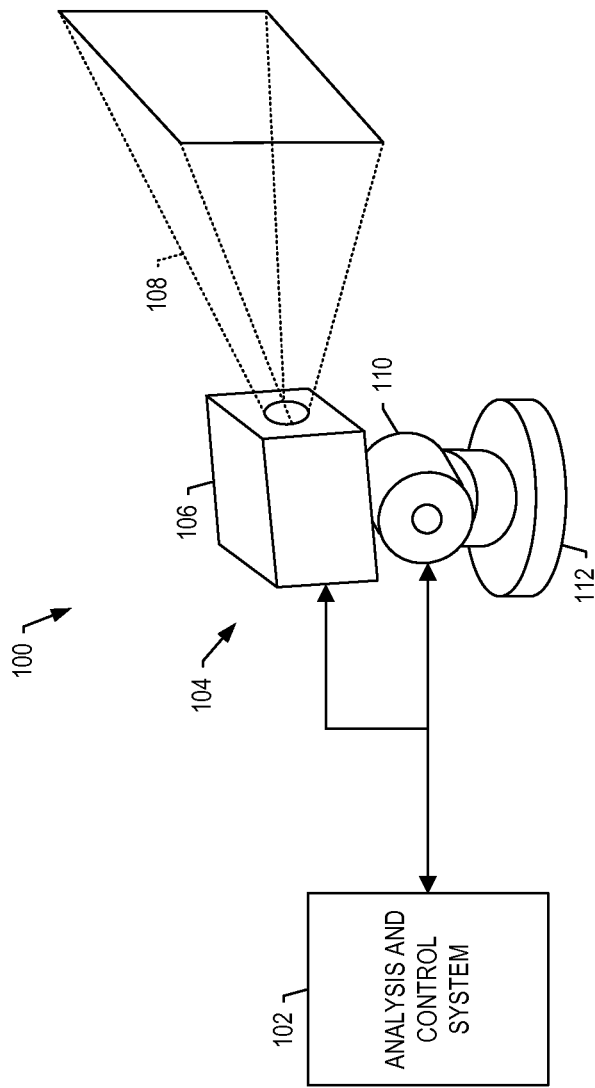
FIG. 1 is an illustration of an object-tracking system in accordance with an example implementation.

FIG. 1 illustrates an object-tracking system 100 according to various example implementations of the present disclosure. As shown, the system includes an analysis and control system 102 connected to or otherwise in communication with one or more platforms 104 (one being shown for example). The analysis and control system and a platform may be connected to or otherwise in communication with one another in a number of different manners, such as directly or indirectly by one or more physical (wired) and/or wireless communications links, networks or the like. The analysis and control system may be located at or remote from a platform such as at a command center, in a vehicle on a person or some other suitable location. In some examples, the analysis and control system may be distributed between the platform at which some of its components may be located, and another, remote location at which others of its components may be located.

The platform 104 may be of any of a number of different types of platforms. Examples of suitable types of platforms include a mobile platform, a stationary platform, a land-based structure, an aquatic-based structure, a space-based structure, a vehicle, an aircraft, an unmanned aerial vehicle, an unmanned ground vehicle, a building, a manufacturing facility, a hospital, an object in a park, or some other suitable type of platform.

As shown, the platform 104 may include one or more cameras 106 each of which may be configured to produce video for a geographic area. The camera may be configured to produce video in any of various levels of light such as from daylight to low-light or even approaching total darkness. In some examples, the camera may be a day camera configured to produce video in daylight and a night camera configured to produce video in low-light/darkness, or the camera may be a day/night camera configured to selectively produce video in daylight or low-light/darkness. More particular examples of suitable cameras include digital cameras, infrared cameras, thermal cameras and the like.

The camera 106 may produce video for a geographic area within which one or more objects—including at times an object-of-interest (OI)—may be moving. As or after the camera produces the video, the camera may provide the video to the analysis and control system 102 such as for display in a common operating picture (COP) or other suitable type of display, which may enable monitoring and surveillance of the geographic area. The geographic area may be any of a number of suitable areas on land, over water or in the air, although example implementations of the present disclosure have particular use in tracking objects moving on land. Examples of suitable geographic areas on land include a neighborhood, a city, a number of city blocks, a town, a park and/or some other suitable type of area. In some examples in which the area is a neighborhood, the camera may produce video of a street in the neighborhood and/or one or more buildings (e.g., houses) on the portion of the street in the neighborhood. Examples of suitable OIs include a vehicle, person, building, aircraft, automobile, truck, tank, train, ship or some other suitable type of OI, although again example implementations may have particular use in tracking objects moving on land.

The camera 106 may provide a limited, and perhaps zoomable field of view (FOV) 108 within which the camera may produce video that depicts a scene including a portion of the geographic area. The camera may controllably movable by the analysis and control system 102, and its field of view may thereby be controllably movable, which may enable the camera to produce video of a greater portion of the geographic area. In some examples, the platform 104 may include a pan-tilt unit (PTU) 110 on or to which the camera may be mounted or otherwise affixed, and which may itself be mounted on or otherwise affixed to a support 112. The PTU may be controllable by the analysis and control system to positionally adjust the camera to selected angles around the vertical, azimuth (pan) axis and the horizontal, elevation (tilt) axis, such as referenced to the earth-fixed coordinate system. In some examples, the PTU may even positionally adjust rotation of the camera to selected angles about a roll camera axis. In this manner, the PTU may cause movement of the camera in at least one of a horizontal direction or a vertical direction of movement.

Video produced and provided by the camera 106 may include a sequence of frames of images produced or displayable at a particular frame rate (e.g., 30 Hz). Each frame (image) may be represented by a plurality of pixels that may be considered point samples (e.g., intensity values) of the frame at respective sample locations or positions. The pixels may be arranged in a rectangular (square or non-square) grid having a width and height that may be given in numbers of pixels. The scene depicted by the video may cover the camera's field of view 108, and the center of the scene may correspond to the center of the field of view.

The frames and thus the video may depict a scene including a portion of geographic area, and at times including one or more moving objects. In accordance with example implementations, the analysis and control system 102 may be configured to receive and perform an analysis of the video to identify one or more moving objects and select one of the moving objects as an OI (at times referred to as a "target" or "track"), and based on the analysis, control movement of the camera and thus its field of view 108 to track the OI as it moves. The analysis may include any of a number of different known video content analysis techniques, such as that provided by video analytics software distributed by Signal Innovations Group of Durham, N.C. In some examples, the video content analysis may include identifying one or more moving objects depicted in the video, and assigning to each a unique identifier (ID). The video content analysis may also include determining characteristic information for each identified object, such as a region around the object (referred to herein without loss of generality as a "bounding box") and a motion vector. In some examples, the bounding box of an identified object may represent its location within the scene, and the motion vector may represent its amount and direction of movement within the scene.

In one example, each moving object may be identified by a unique identifier (ID). An object's bounding box representing may be defined by the pixel location of one of its vertices (corners), and its size in pixels. In one example, an object's motion vector may be given in pixel coordinates. The motion vector may reflect an offset of the object's bounding box between adjacent frames in the video, and again, it may represent the object's amount and direction of movement. In various examples, an object's direction of movement may be described as left-right (left-to-right or simply to the left) or right-left (right-to-left or simply to the right), and/or up-down (up-to-down or simply down) or down-up (down-to-up or simply up).

The analysis and control system 102 may be configured to control the direction 25 and speed of movement of the camera 106 to maintain a moving OI within its field of view 108. In some examples, the analysis and control system may perform a constant analysis of video and adjustment of camera direction and speed to facilitate maintaining the OI at or near the center of the camera's field of view, which may afford the greatest amount of visible pixel space as a buffer for movement of the field of view as either the actual or relative speed of the OI changes. In some examples, the analysis and control system may incorporate minimum and maximum speeds of the camera to avoid rapid acceleration of the camera's field of view toward fast moving objects or false alarms.

The analysis and control system 102 may pan the camera 108 in the x-direction to follow horizontal (right-left, left-right) movement of an OI, and/or tilt the camera in the y-direction to follow vertical (down-up, up-down) movement of an OI. In some examples, the analysis and control system may employ a gradual tilt (elevation change) to avoid operator annoyance and over-shooting an OI. The analysis and control system may employ OI selection logic and a "coasting period," which may facilitate graceful handling of an OI as it becomes obscured and then reappears, at which point the analysis and control system may resume tracking the respective object.

Figure 2:
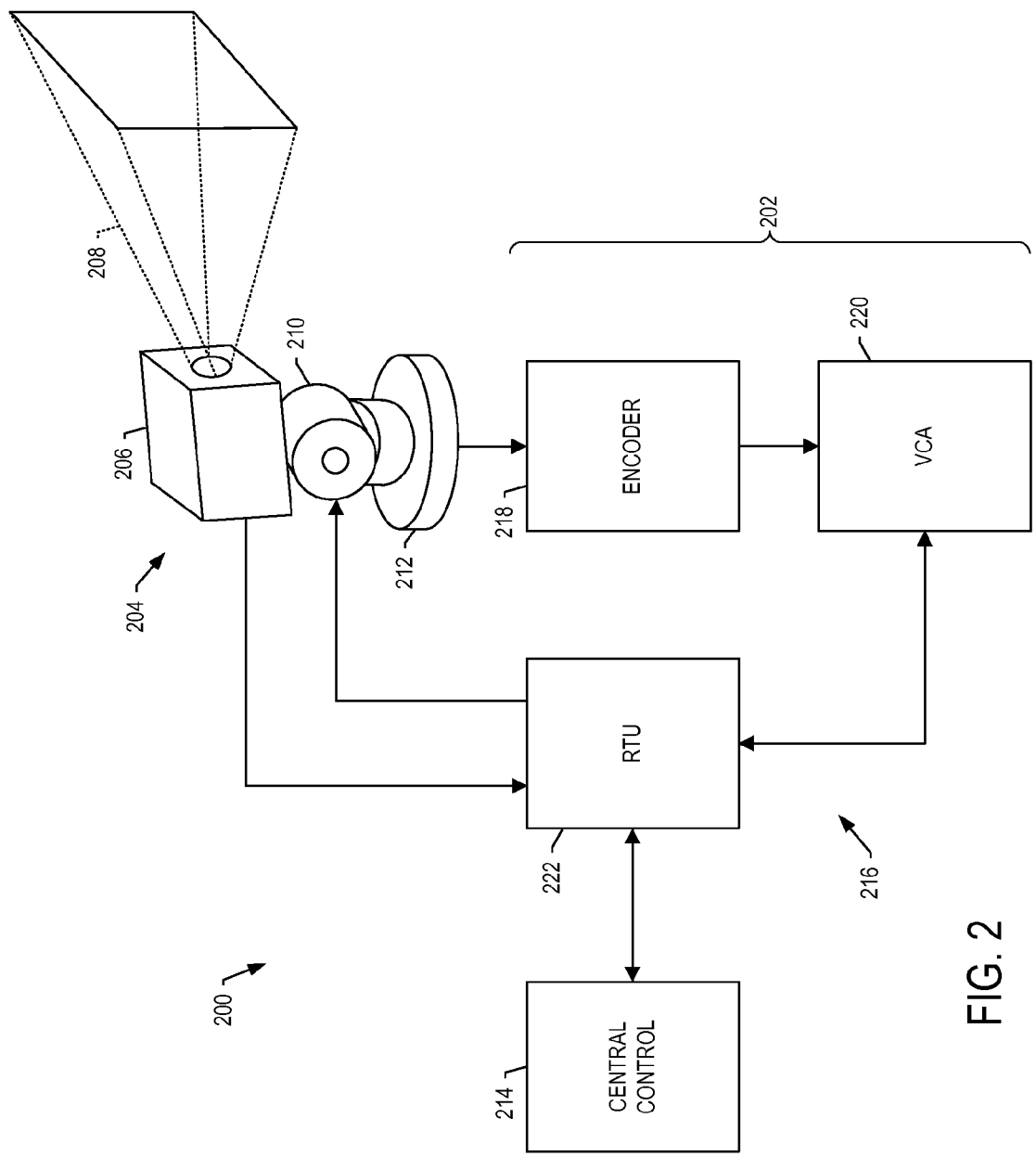
FIG. 2 is an illustration of an example an object-tracking system, which in various example implementations may correspond to the object-tracking system of FIG. 1.

FIG. 2 illustrates an object-tracking system 200, which in various example implementations may correspond to the object-tracking system 100 of FIG. 1. The object-tracking system 200 includes an analysis and control system 202 connected to or otherwise in communication with one or more platforms 204, which may correspond to the analysis and control system 102 and one or more platforms 104 of FIG. 1. The platform 204 may include one or more cameras 206 each of which may provide a field of view 208, and which may correspond to the one or more cameras 106 and field of view 108 of FIG. 1. And the camera 206 may be mounted on or otherwise affixed to a PTU 210 that itself may be mounted on or otherwise affixed to a support 212, and which may correspond to the PTU 110 and support 112 of FIG. 1.

As shown in FIG. 2, the analysis and control system 202 may include a central control unit 214 coupled to (by wire or wirelessly) one or more remote units 216 for respective ones of one or more platforms 204. In some examples, the central control unit may be located remote (at a remote location) from the platform(s), or at one of the platforms and remote from others of the platforms. In some examples, the remote unit(s) may be located at respective ones of the platform(s).

In various examples, the remote unit 216 may include an encoder 218, video content analysis (VCA) module 220 and/or remote terminal unit (RTU) 222. Similar to before, the camera 206 may be configured to produce video. In one example, the video may be analog video, and the encoder 218 may be configured to encode the video such as into MPEG video or another suitable video format. The VCA module 218 may be coupled to the encoder, and configured to perform video content analysis of the video. The VCA module may thereby identify moving objects in the video, each of which may have a unique ID and characteristic information such as a bounding box and motion vector. The VCA module may also be coupled to the RTU, and configured to provide the video and the ID and characteristic information for each identified object in the video. The RTU may be coupled to the central control unit 214, and may be configured to provide the video, and possibly also the ID and characteristic information for each identified object, such as for display by the central control unit in a COP or other suitable type of display.

The RTU 222 may be coupled to the PTU 210, and configured to select one of the identified objects as an OI, and control the direction and speed of movement of the PTU and thus the camera 206 to maintain the (moving) OI within its field of view 208. In some examples, the VCA module 218 may perform a constant analysis of video, and the RTU may perform a constant adjustment of camera direction and speed to facilitate maintaining the OI at or near the center of the camera's field of view. As suggested above, the RTU may pan the camera in the x-direction to follow horizontal movement of the OI, and/or tilt the camera in the y-direction to follow vertical movement of the OI. In some examples, the video content analysis may depend on the azimuth (pan), elevation (tilt) and/or zoom of the camera; and in these examples, the PTU and/or camera may provide this information to the VCA module, directly or via the RTU.

As indicated above, the analysis and control system 102, or in some examples the VCA module 220 of the analysis and control system 202, may be configured to receive and perform an analysis of video to identify one or more objects depicted in the video. The analysis may be performed according to any of a number of different known video content analysis techniques. In some examples, the analysis may include for each of one or more identified objects, assigning a unique ID to the object, and determining characteristic information such as a bounding box (location, size) and a motion vector that represent the object's location and its amount and direction of movement.

FIG. 3 illustrates a flowchart including various operations in a method of selecting an identified object as an OI, and controlling movement of the camera 106 (e.g., camera 206) to track the OI, according to one example implementation of the present disclosure. Although aspects such as location, amount and direction of movement may at times be described in the context of an identified object, it should be understood that some examples may more particularly apply to the bounding box of the identified object. In various examples, the method of FIG. 3 may be performed at least partially if not entirely by the analysis and control system 102, or in some examples the RTU 222 of the analysis and control system 202.

As shown in block 302, the method may include receiving a video or rather frames of video depicting a scene of a portion of a geographic area and including one or more identified objects. Each identified object may have unique ID, bounding box representing its location within the scene, and a motion vector representing its amount and direction of movement (vertical, horizontal) within the scene—none, some or all of which may be displayable with the video. The method may then include selecting one of the identified object(s) as a current OI, as shown in block 304. The identified object may be selected in any of a number of different manners.

In one example, the selected object may be the identified object located closest to the center of the scene depicted by the video, which as indicated above, may correspond to the center of the camera's field of view 108 (e.g., field of view 208). In another example, the video may be displayed within a window of a graphical user interface (GUI), and user input may indicate a user-selected location within the scene, such as through use of an appropriate pointing device (e.g., mouse, joystick, touchpad, touchscreen). In this example, the selected object may be the identified object located closest to the user-selected location. In a more particular example, the selected object may be the identified object closest to the user-selected location that has also been updated within a prior certain time (e.g., 2,000 milliseconds). Again, this time and other measures/thresholds may be configurable. In this regard, an update to an identified object may refer to a change in any or all of its characteristic information (e.g., bounding box and/or motion vector) between frames of video.

The method may include tracking the current OI, as shown in block 306. As the current OI is tracked, method may include continuously receiving frames of video that may include updates to the current OI, as well as perhaps updates to any other identified objects. The method may include calculating, from the updates to the current OI, an appropriate direction and speed of movement of the camera 106 (e.g., camera 206) to maintain the current OI within the scene depicted by the video (e.g., close to its center), which as indicated above may cover camera's field of view 108. The camera may be caused to move according to the calculated direction and speed, as shown in block 308. And some examples, this may continue as long as updates to the current OI are received with at least a certain threshold (T1) period (e.g., 1,500 milliseconds) or frequency (e.g., 0.667 Hz), as shown in block 310 (and again in blocks 306, 308).

In the instance in which an update to the current OI is not received within T1, the method may include determining whether the scene depicted by the video includes another suitable identified object to track, as shown in block 312. More particularly, for example, the method may include determining if the scene includes an identified object located (or whose bounding box is located) within a certain (configurable) distance (e.g., 80 pixels) of the last updated location of the current OI (or its bounding box) in the current OI's direction of movement, which may also be between the last updated location of the current OI and edge (e.g., horizontal) of the scene in the current OI's direction of movement. This other object may also be confined to an object that has been updated within a prior certain time (e.g., 1,500 milliseconds). In some examples, such an object may (but need not) represent the current OI that has become obscured or otherwise left within the scene, but then reappeared within the respective prior time.

If the scene does include another suitable identified object, the method may include selecting the respective identified object as a current OI, as shown in block 314, after which the method may begin tracking the now current OI similar to before (see blocks 306-312). Otherwise, if the scene does not include another suitable identified object, the method may include waiting up to an additional certain threshold (T2) time (e.g., 3,500 milliseconds for a T1+T2=5,000 milliseconds) to receive an update to the current OI, in which case tracking of the current OI may continue, as shown in block 316 (and again in blocks 306-312), while continuing to receive video. But in the case that an update to the current OI is not received within the additional threshold (T2) time, the method may include selection of another one of the identified object(s) as the current OI to track, such as the object closest to the closest to the center of the scene or user-selected location, similar to before (see block 304). The method may then continue with the now current OI (see blocks 306-316), while continuing to receive video.

FIG. 4 (including FIGS. 4a and 4b) illustrates a flowchart including various operations in a method of controlling movement of a camera 106 (e.g., camera 206) to autonomously track a mobile OI. The camera may produce video depicting a scene including an OI (or a current OI), and the method may generally relate to causing movement of the camera according an appropriate direction and speed to maintain the (movable) OI within the scene, which may be covered by the camera's field of view 108 (field of view 208). This may be one example of the operation shown and described with respect to block 308 of FIG. 3 above. As indicated above, although aspects such as location, amount and direction of movement may at times be described in the context of an OI, it should be understood that some examples may more particularly apply to the bounding box of the OI. Also, similar to FIG. 3, in various examples, the method of FIG. 4 may be performed at least partially if not entirely by the analysis and control system 102, or in some examples the RTU 222 of the analysis and control system 202.

As shown in block 402, the method may include selecting non-zero minimum and maximum speeds of the PTU 110 (e.g., PTU 210) and thus the camera 106. In some examples, the minimum speed may be equal to or greater than the minimum speed at which the PTU is capable of moving; and similarly, in some examples, the maximum speed may be equal to or less than the maximum speed at which the PTU is capable of moving. In one example, the minimum and maximum speeds may be selected to define a range of speeds over which the camera may produce a perceptible video. The minimum and maximum speeds may be set as functions of (e.g., scaled to) the camera's field of view 108, and may define a range of speeds in percentage increments (e.g., 10%) of the field of view. In some examples, the field of view may be zoomable, and in these examples, the minimum and maximum speeds may be calculated from their respective functions and the current field of view, as shown in block 404.

The method may include receiving a video or rather frames of video depicting a scene of a portion of a geographic area and including the OI as one of its identified object(s), as shown in block 406 (cf. block 302). The OI may have unique ID and characteristic information such as a bounding box representing its location within the scene, and a motion vector representing its amount and direction of movement (vertical, horizontal) within the scene—none, some or all of which may be displayable with the video. This may occur continuously and include to the current OI, which may be reflected by a change in any or all of its characteristic information between frames of video.

In some examples, the method may include tilting the camera 106 in the y-direction to follow or otherwise track vertical (down-up, up-down) movement of the OI, as shown in block 408. In these examples, the method may include causing movement of the camera in the vertical direction of movement of the OI and at the set minimum speed of the PTU 110 for a certain time (e.g., 400 milliseconds) in instances in which the OI is more than a certain distance (e.g., 60 pixels) from the center of the scene in the vertical direction of movement, as shown in block 410.

In some examples, the method may include panning the camera 106 in the x-direction to follow or otherwise track horizontal (right-left, left-right) movement of the OI, as shown in block 412. In these examples, the method may include determining the OI's direction of movement such as from its motion vector, as shown in block 414. In some examples in which the OI is at least temporarily stationary (not moving), the direction of movement may be taken from its last update in which the OI moved (the OI initially selected as a moving object). In instances in which the OI's direction of movement has changed, the camera may be caused to move in the OI's now current direction of movement at the set minimum speed of the PTU 110; otherwise, a prior speed of the camera in the OI's direction of movement may be maintained.

The method may include calculating the OI's speed in its horizontal direction of movement, as shown in block 416. In one example, the OI's speed may be calculated from its motion vector and the frame rate of the camera 106, and may be given in pixels/second, it's the current speed of the camera may be maintained (e.g., set minimum speed of the PTU 110) if the OI is moving at greater than a certain (configurable) speed (e.g., 10 pixels/second); or otherwise, the speed of the camera may be caused to decrease to zero by decreasing the speed of the PTU to zero, as shown in block 418.

The method may include calculating the OI's distance from either or both horizontal edges of the scene—a first edge being in the OI's direction of movement, and/or a second edge being opposite the direction of movement, as shown in block 420. The OI located too close to the edge of the scene in its direction of movement may indicate that the camera 106 may not be moving fast enough to keep up its field of view 108 (or the depicted scene) with the OI. On the other hand, the OI located too close to the edge of the scene opposite its direction of movement may indicate that the camera 106 may be moving too fast such that the OI may not be keeping up with its field of view 108 (or the depicted scene).

In instances in which the OI is located greater than respective certain distances from the horizontal edges in or opposite the direction of movement, the speed of the camera 106 may be caused to increase or decrease to bring the OI closer to the center of the scene, as shown in block 422. More particularly, in instances in which the OI is located less than a (first) certain distance (e.g., 50 pixels) from the horizontal edge in the direction of movement, the speed of the camera 106 in the OI's direction of movement may be caused to increase to catch up to the OI—or rather catch up the center of the scene to the OI. In some examples, the speed of the camera may be caused to increase up to the lower of the set maximum speed of the PTU 110 and a certain number of increments in the range (e.g., up to three often increments) between the set minimum and maximum speeds, to move the OI further from if not outside of the certain distance from the edge of the scene in its direction of movement.

In instances in which the OI is located less than a (second) certain distance (e.g., 100 pixels) from the horizontal edge opposite the direction of movement, the speed of the camera in the OI's direction of movement may be caused to decrease to allow the OI to catch up—or rather allow the OI to catch up to the center of the scene. In some examples, the first certain distance from the horizontal edge in the direction of movement may be the same as or different from the second certain distance from the horizontal edge opposite the direction of movement. And in some examples, the speed of the camera may be caused to decrease down to the set minimum speed of the PTU 110 or even down to zero, to move the OI further from if not outside of the certain distance from the edge of the scene opposite its direction of movement.

The method may also include calculating the difference in speed (in the horizontal direction of movement) between the OI and camera 106, which may reflect the rate of change of the OI's horizontal distance from the center of the scene, as shown in block 424. In one example, this speed or rate of change may be calculated as a function of the time between updates to the OI, and the difference in distance from the center of the scene between the respective updates.

In some instances, the difference in speed may indicate the OI moving away from or toward the center of the scene. For example, the OI may be moving away from the center of the scene when the OI's speed is less than that of the camera 106, and the OI is between the center of the scene and its horizontal edge opposite the direction of movement. Likewise, for example, the OI may be moving away from the center of the scene when the OI's speed is greater than that of the camera, and the OI is between the center of the scene and its horizontal edge in the direction of movement. On the other hand, for example, the OI may be moving toward the center of the scene when the OI's speed is greater than that of the camera, and the OI is between the center of the scene and its horizontal edge opposite the direction of movement. And the OI may be moving away from the center of the scene when the OI's speed is less than that of the camera, and the OI is between the center of the scene and its horizontal edge in the direction of movement.

In instances in which the OI is noticeably moving away from the center of the scene, or in some examples in these instances and in which the difference in speed is greater than a (first) certain speed (e.g., 50 pixels/second), the speed of the camera 106 may be caused to increase or decrease based on the location of the OI relative to the center of the scene to continue bringing the OI closer to it, as shown in block 426. That is, the speed of the camera may be caused to increase if the OI is past the center of the scene in its direction of movement (i.e., the OI is between the center of the scene and horizontal edge in the direction of movement), which may allow the center of the scene to catch up to the OI. Otherwise, the speed of the camera may be caused to decrease if the OI is short of the center of the scene (i.e., the OI is between the center of the scene and horizontal edge opposite the direction of travel), which may allow the OI to catch up to the center of the scene.

In instances in which the OI is noticeably moving toward from the center of the scene, or in some examples in these instances and in which the difference in speed is greater than a (second) certain speed (e.g., 30 pixels/second), the speed of the camera 106 may be maintained or caused to decrease based on the location of the OI relative to the center of the scene to continue bringing the OI closer to it, as shown in block 428. That is, the speed of the camera may be maintained (or ceased any prior increase in speed), or the speed may be caused to decrease down to the set minimum speed if the OI is within a certain distance (e.g., 100 pixels) of the center of the scene. In some examples, the first certain speed moving away from the center of the scene may be the same as or different from the second certain speed moving toward the center of the scene.

In instances in which the OI is located greater than the respective certain distances from the horizontal edges, and the differences in speed between the OI and center of the scene are less than the respective certain speeds, the OI may be considered in synch with the scene. In these instances, the speed of the camera 106 may be maintained in the OI's direction of movement, as shown in block 430. Or in some examples in which an update to the OI is not received within a certain time (e.g., T1), the camera may be caused to stop by decreasing the speed of the PTU 110 to zero, as shown in block 432. In either instance, the method may include a delay of a certain time (e.g., 400 milliseconds), after which the method may repeat (see blocks 408-432), while continuing to receive video.

According to example implementations of the present disclosure, the analysis and control system 102. Similarly, the example of the analysis and control system 202, including its components such as the central control unit 214, and the remote unit 216 including its encoder 218, VCA module 220 and RTU 222, may be implemented by various means according to example implementations. Means for implementing analysis control system and its subsystems, components and the like may include hardware, alone or under direction of one or more computer program code instructions, program instructions or executable computer-readable program code instructions from a computer-readable storage medium.

In one example, one or more apparatuses may be provided that are configured to function as or otherwise implement the analysis and control system 102, 202 shown and described herein in various example implementations. In examples involving more than one apparatus, the respective apparatuses may be connected to or otherwise in communication with one another in a number of different manners, such as directly or indirectly via a wireline or wireless network or the like.

FIG. 5 illustrates an apparatus 500 that according to some examples may be configured to at least partially implement the analysis and control system 102, or in some examples the RTU 222 of the analysis and control system 202. Generally, the apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 502 (e.g., processor unit) connected to a memory 504 (e.g., storage device).

The processor 502 is generally any piece of computer hardware that is capable of processing information such as, for example, data, computer-readable program code, instructions or the like (at times generally referred to as "computer programs," e.g., software, firmware, etc.), and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 504 (of the same or another apparatus).

The processor 502 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 504 is generally any piece of computer hardware that is capable of storing information such as, for example, data, computer programs (e.g., computer-readable program code 506) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable 15 transmission medium.

In addition to the memory 504, the processor 502 may also be connected to one or more interfaces for displaying, transmitting and/or receiving information. The interfaces may include a communications interface 508 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wireline) and/or wireless communications links. Examples of suitable communication interfaces include a network interface controller (NIC), wireless NIC (WNIC) or the like.

The user interfaces may include a display 510 and/or one or more user input interfaces 512 (e.g., input/output unit). The display may be configured to present or otherwise display information to a user, suitable examples of which include a liquid crystal display (LCD), light-emitting diode display (LED), plasma display panel (PDP) or the like. The user input interfaces may be wireline or wireless, and may be configured to receive information from a user into the apparatus, such as for processing, storage and/or display. Suitable examples of user input interfaces include a microphone, image or video capture device, keyboard or keypad, mouse, joystick, touch-sensitive surface (e.g., touchpad, touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 500 may include a processor 502 and a computer-readable storage medium or memory 504 coupled to the processor, where the processor is configured to execute computer-readable program code 506 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:
   a processor; and
   a computer-readable storage medium coupled to the processor and having computer- readable program code stored therein that, in response to execution by the processor, causes the apparatus to at least:
   receive from a camera, video depicting a scene having a center bounded by a first horizontal edge and a second horizontal edge, the scene also including an identified object of interest (OI) having characteristic information including a region around the identified OI and a motion vector representing a location, and an amount and direction of movement of the identified OI within the scene, the direction of movement including at least a horizontal direction of movement;
   calculate from the location of the identified OI, a distance of the identified OI from either or both of the horizontal edges of the scene, and in which the first horizontal edge is in the horizontal direction of movement and the second horizontal edge is opposite the horizontal direction of movement; and at least one of,
   cause an increase in a speed of the camera in the horizontal direction of movement in an instance in which the identified OI is located less than a first certain distance from the first horizontal edge; or
   cause a decrease in the speed of the camera in an instance in which the identified OI is located less than a second certain distance from the second horizontal edge.

2. The apparatus of claim 1, wherein the apparatus being caused to cause the increase in the speed of the camera includes being caused to cause the increase in the speed of the camera up to lower of a set maximum speed and a certain number of increments in a range of speeds between a set minimum speed and the set maximum speed, and in which at least the set maximum speed is less than a maximum capable speed of the camera.

3. The apparatus of claim 1, wherein the computer-readable storage medium has further computer-readable program code stored therein that, in response to execution by the processor, causes the apparatus to further
   calculate a speed of the OI in the horizontal direction of movement; and
   maintain the speed of the camera if the speed of the OI is greater than a certain speed; or otherwise,
   cause a decrease in the speed of the camera to zero.

4. The apparatus of claim 1, wherein the computer-readable storage medium has further computer-readable program code stored therein that, in response to execution by the processor, causes the apparatus to further:
   calculate a speed of the OI in the horizontal direction of movement;
   calculate a difference in speed between the identified CH and camera, the difference in speed indicating the identified OI moving away from or toward the center of the scene; and in at least one instance in which the identified OI is moving away from the center of the scene and the difference in speed is greater than a certain speed,
   cause an increase in the speed of the camera if the identified GI is between the center of the scene and the first horizontal edge; or otherwise,
   cause a decrease in the speed of the camera if the identified OI is between the center of the scene and the second horizontal edge.

5. The apparatus of claim 1, wherein the computer-readable storage medium has further computer-readable program code stored therein that, in response to execution by the processor, causes the apparatus to further:
   calculate a speed of the OI in the horizontal direction of movement;
   calculate a difference in speed between the identified OI and camera, the difference in speed indicating the identified OI moving away from or toward the center of the scene; and in at least one instance in which the identified OI is moving toward the center of the scene and the difference in speed is greater than a certain speed,
   maintain the speed of the camera, or otherwise cause a decrease in the speed of the camera if the identified OI is within a certain distance of the center of the scene.

6. The apparatus of claim 1, wherein the direction of movement also includes a vertical direction of movement, and wherein the computer-readable storage medium has further computer-readable program code stored therein that, in response to execution by the processor, causes the apparatus to further:

cause movement of the camera in the vertical direction of movement and at a set minimum speed for a certain time in an instance in which the identified OI is more than a certain distance from the center of the scene in the vertical direction of movement.

7. The apparatus of claim 1, wherein the scene includes a plurality of identified objects, and wherein the computer-readable storage medium has further computer-readable program code stored therein that, in response to execution by the processor, causes the apparatus to further:
select one of the identified objects as the OI, the selected one of the identified objects being located closest to the center of the scene, or located closest to a user-selected location within the scene.

8. The apparatus of claim 1, wherein the apparatus being caused to receive video includes being caused to continuously receive frames of video, and including one or more updates to the OI each of which includes a change in either or both of the region around the identified OI or the motion vector, and
wherein the apparatus is caused to calculate the distance, and at least one of cause the increase in the speed or the decrease in the speed occur during tracking of the OI, and continue as long as updates to the OI are received with at least a certain threshold period or frequency.

9. The apparatus of claim 8, wherein the computer-readable storage medium has further computer-readable program code stored therein that, in response to execution by the processor and in an instance in which an update to the OI is not received within the certain threshold, causes the apparatus to:
determine if the scene includes an identified object located within a certain distance of a last updated location of the OI in the horizontal direction of movement; and
select the respective identified object as the OI if the scene includes the respective identified object; or otherwise if the scene does not include the respective identified object,
wait up to an additional certain threshold time to receive an update to the OI, in which case tracking of the OI continues.

10. A method comprising:
receiving from a camera, video depicting a scene having a center bounded by a first horizontal edge and a second horizontal edge, the scene also including an identified object of interest (OI) having characteristic information including a region around the identified OI and a motion vector representing a location, and an amount and direction of movement of the identified OI within the scene, the direction of movement including at least a horizontal direction of movement;
calculating from the location of the identified OI, a distance of the identified OI from either or both of the horizontal edges of the scene. and in which the first horizontal edge is in the horizontal direction of movement and the second horizontal edge is opposite the horizontal direction of movement; and at least one of,
causing an increase in a speed of the camera in the horizontal direction of movement in an instance in which the identified OI is located less than a first certain distance from the first horizontal edge; or
causing a decrease in the speed of the camera in an instance in which the identified OI is located less than a second certain distance from the second horizontal edge.

11. The method of claim 10, wherein causing the increase in the speed of the camera includes causing the increase in the speed of the camera up to lower of a set maximum speed and a certain number of increments in a range of speeds between a set minimum speed and the set maximum speed, and in which at least the set maximum speed is less than a maximum capable speed of the camera.

12. The method of claim 10 further comprising:
calculating a speed of the OI in the horizontal direction of movement; and
maintaining the speed of the camera if the speed of the OI is greater than a certain speed; or otherwise,
causing a decrease in the speed of the camera to zero.

13. The method of claim 10 further comprising:
calculating a speed of the OI in the horizontal direction of movement;
calculating a difference in speed between the identified OI and camera, the difference in speed indicating the identified OI moving away from or toward the center of the scene; and in at least one instance in which the identified OI is moving away from the center of the scene and the difference in speed is greater than a certain speed,
causing an increase in the speed of the camera if the identified OI is between the center o the scene and the first horizontal edge; or otherwise,
causing a decrease in the speed of the camera if the identified OI is between the center of the scene and the second horizontal edge.

14. The method of claim 10 further comprising:
calculating a speed of the OI in the horizontal direction of movement;
calculating a difference in speed between the identified CH and camera, the difference in speed indicating the identified OI moving away from or toward the center of the scene; and in at least one instance in which the identified OI is moving toward the center of the scene and the difference in speed is greater than a certain speed,
maintaining the speed of the camera, or otherwise causing a decrease in the speed of the camera if the identified OI is within a certain distance of the center of the scene.

15. The method of claim 10, wherein the direction of movement also includes a vertical direction of movement, and wherein the method further comprises:
causing movement of the camera in the vertical direction of movement and at a set minimum speed for a certain time in an instance in which the identified OI is more than a certain distance from the center of the scene in the vertical direction of movement.

16. The method of claim 10, wherein the scene includes a plurality of identified objects, and wherein the method further comprises:
selecting one of the identified objects as the OI, the selected one of the identified objects being located closest to the center of the scene, or located closest to a user-selected location within the scene.

17. The method of claim 10, wherein receiving video includes continuously receiving frames of video, and including one or more updates to the OI each of which includes a change in either or both of the region around the identified OI or the motion vector, and
wherein calculating the distance, and at least one of causing the increase in the speed or the decrease in the speed occur during tracking of the OI, and continue as long as updates to the OI are received with at least a certain threshold period or frequency.

18. The method of claim 17, wherein in an instance in which an update to the OI is not received within the certain threshold, the method further comprises:

determining if the scene includes an identified object located within a certain distance of a last updated location of the OI in the horizontal direction of movement; and selecting the respective identified object as the OI if the scene includes the respective identified object; or otherwise if the scene does not include the respective identified object, waiting up to an additional certain threshold time to receive an update to the OI, in which case tracking of the OI continues.

19. A computer-readable storage medium that is non-transitory and has computer-readable program code stored therein that, in response to execution by a processor, cause an apparatus to at least:

receive from a camera, video depicting a scene having a center bounded by a first horizontal edge and a second horizontal edge, the scene also including an identified object of interest (OI) having characteristic information including a region around the identified OI and a motion vector representing a location, and an amount and direction of movement of the identified OI within the scene, the direction of movement including at least a horizontal direction of movement;

calculate from the location of the identified OI, a distance of the identified OI from either or both of the horizontal edges of the scene, and in which the first horizontal edge is in the horizontal direction of movement and the second horizontal edge is opposite the horizontal direction of movement; and at least one of, cause an increase in a speed of the camera in the horizontal direction of movement in an instance in which the identified OI is located less than a first certain distance from the first horizontal edge; or cause a decrease in the speed of the camera in an instance in which the identified OI is located less than a second certain distance from the second horizontal edge.

20. The computer-readable storage medium of claim 19, wherein the apparatus being caused to cause the increase in the speed of the camera includes being caused to cause the increase in the speed of the camera up to lower of a set maximum speed and a certain number of increments in a range of speeds between a set minimum speed and the set maximum speed, and in which at least the set maximum speed is less than a maximum capable speed of the camera.

* * * * *